Figure 1:
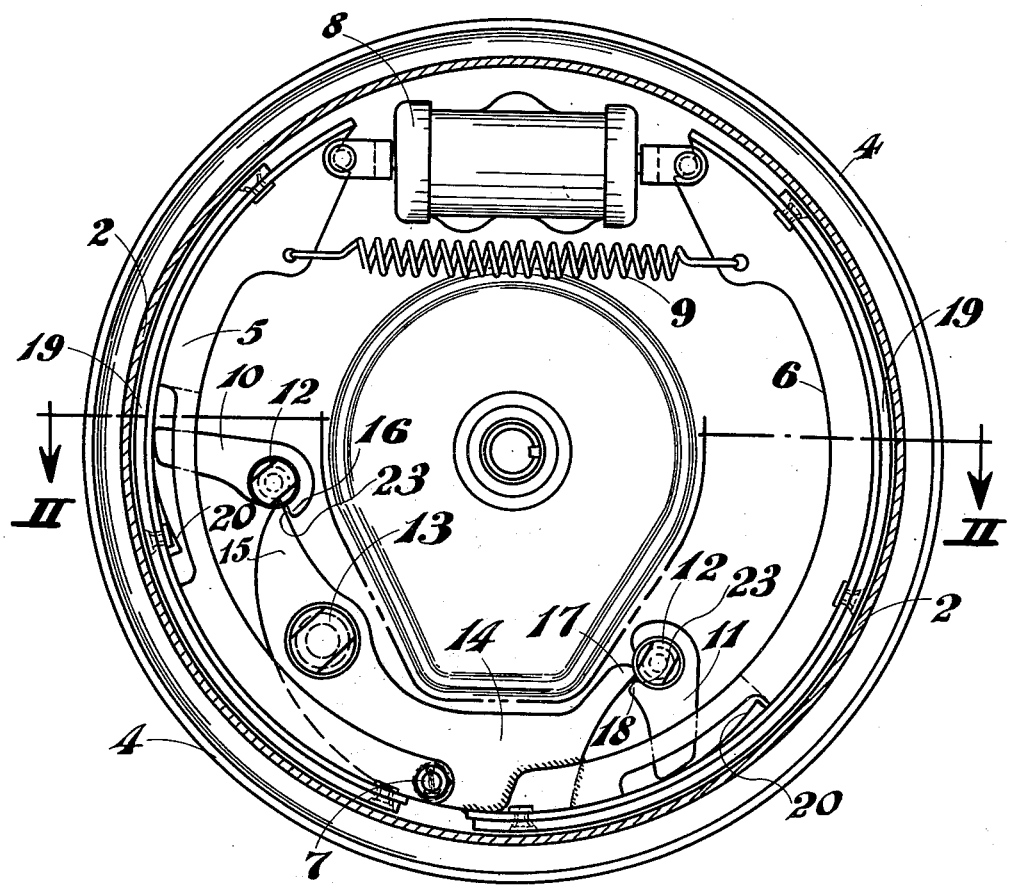

Nov. 23, 1943.  W. D. KOCH  2,334,935
INTERNAL-EXPANDING BRAKING DEVICE
Filed Aug. 11, 1941

Inventor
W. D. Koch
By C. F. Wenderoth
Atty.

Patented Nov. 23, 1943

2,334,935

UNITED STATES PATENT OFFICE 2,334,935

INTERNAL-EXPANDING BRAKING DEVICE

Wilfred Dell Koch, Troyeville, Johannesburg, Transvaal, Union of South Africa

Application August 11, 1941, Serial No. 406,417
In the Union of South Africa November 19, 1940

6 Claims. (Cl. 188—79.5)

This invention relates to improvements in internal-expanding braking and clutching devices and applies particularly to the internal-expanding type of brake as extensively used on motor vehicles.

According to this known type of brake, two or more pivotally connected arcuate brake shoes are adapted to be expanded within a brake or friction drum by mechanical or hydraulic means acting to force their free ends apart. The idle or "off" position of the shoes is determined by several circumferentially spaced eccentric adjustable stops against which the shoes are retracted by spring pressure when pressure on the brake pedal is released. Adjustment due to wear of the brake linings is effected by means of these adjustable stops and one or more adjustable anchor bolts. This adjustment, particularly for centralising the brake shoes with respect to the friction drum so as to obtain balanced action of the brakes, has always been a difficult and tedious operation.

An object of the present invention is to improve this type of brake so as to make it self-adjusting as regards compensation for wear and substantially self-centralising.

According to the invention, a braking or clutching device of the type described above, is characterised in that motion derived from the normal outward expanding movement of the arcuate shoes to their operative positions, is employed to adjust one or more movable stop members locating the shoes in their retracted positions. The arrangement is such that said stop members, irrespective of the condition of wear of the shoe linings, provide for a constant minimum clearance to be maintained between the shoe linings and the friction drum when the shoes are in their retracted positions, whereby adjustment for wear and centralisation of the shoes, takes place automatically during normal use of the device.

It will be understood that in operation the gradual wear of the shoe linings, permits the aforementioned lever arms to take up positions which cause the cam-shaped stop members to define the retracted position of the shoes nearer to the drum, so that the shoes are automatically pressed outwardly to compensate for said wear. In other words the actual travel of the shoes from the "off" to the "on" positions remains substantially constant notwithstanding the gradual wearing away of the linings and/or drum.

To enable the invention to be more clearly understood and carried into practice, reference is now made to the accompanying drawing, in which like reference numerals denote like parts throughout the several views.

Figure 2:
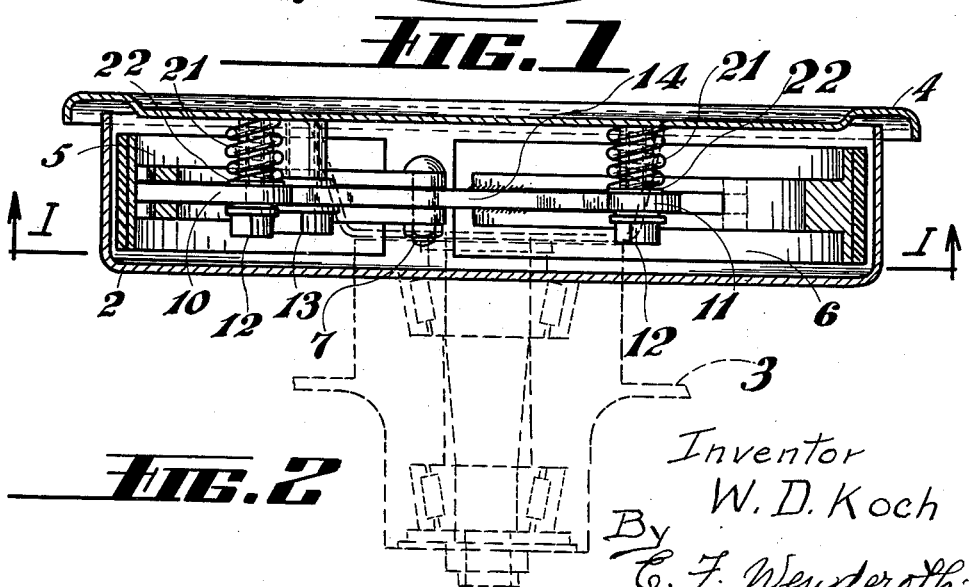

In the drawing:

Fig. 1 is a vertical section taken on line I—I of Fig. 2, of a brake for a motor vehicle, constructed according to the invention, shown in the "off" position, and Fig. 2 is a sectional plan view taken on line II—II of Fig. 1.

Referring to the drawing reference 2 denotes a brake drum to which the usual road wheel 3 (indicated in dotted outline) is attached in any known manner. The stationary shoe plate 4 is likewise rigidly secured to the vehicle in known manner. Located within the drum 2 are two brake shoes 5 and 6, shod with brake-lining material 19, which are pivotally connected together by the pivot pin 7 as regards their lower ends, and as regards their upper ends, are adapted to be expanded outwardly for brake applying purposes by the hydraulic cylinder 8 also of known construction. A tension spring 9 tends to urge the shoes 5 and 6 towards their "off" or retracted positions against cam-shaped stop members 10 and 11 respectively, which are rotatably mounted on stop pins 12 projecting from and fixed to the shoe plate 4. The shoe 6, which with clockwise rotation of the drum 2, has the known characteristic of being self-energising, is pivotally mounted on the inwardly disposed anchor bolt 13 by means of the rigidly connected or integrally formed extension 14. The extension 14 in one direction is extended beyond the anchor bolt 13 to form the lever arm 15 the end striking face of which is adapted to co-act with the shoulder 16 on the stop member 10 for the purpose of causing partial rotation thereof for adjustment purposes. In the opposite direction the extension 14 is extended or shaped to form the lever arm 17, the end striking face of which is adapted to co-act with the shoulder 18 on the stop member 11 for a similar purpose. The ends of stop members 10 and 11 are preferably arranged to co-act with ramp-shaped contact faces 20 provided on the shoes. As shown the stop members are conveniently arranged to operate in slotted openings provided in the shoes. To maintain the stop members 10 and 11 in their adjusted positions, a compression spring 21 threaded on to each of the stop pins 12, is arranged to press a friction washer 22 against their sides, as clearly shown in Fig. 2, whereby rotational movement can only take place after the frictional resistance thereby created is overcome.

Before describing the operation of the brake, attention must be directed to the small clearance spaces 23 provided between the striking faces of the lever arms 15 and 17, and their co-acting shoulders 16 and 18 respectively. The several parts are so designed that, when the brakes are fully applied, the said striking faces on the lever arms just make contact with their respective shoulders on the stop members. It will accordingly be understood that once the stop members 10 and 11 have been correctly set, movement thereof for adjustment purposes will only take place after a certain amount of wear has taken place in the linings 19 or, for that matter, in the drum 2 itself, which, by permitting the brake shoes to pivot to a greater extent about their pivot axes, increases the arc of movement of the lever arms 15 and 17 and consequently causes a small adjusting movement of the stop members to take place, sufficient to compensate for the wear which has occurred.

In operation therefore, depression of the usual brake pedal (not shown) admits pressure fluid to the hydraulic cylinder 8 whereby the top ends of the brake shoes 5 and 6 are forced apart to apply the brakes. As previously described the stop members 10 and 11 are only adjusted if and when wear takes place.

What I claim is:

1. An improved brake of the internal-expanding type, comprising a brake drum, a backing plate therefor and two pivotally connected arcuate shoes co-acting with said brake drum, a common pivot pin connecting said shoes, linings on said shoes, an anchor bolt on said backing plate, the pivoted end of one of said shoes being extended beyond the common pivot pin and being directed inwardly where it is pivotally attached, inwardly from said extended end, to said anchor bolt on the backing plate, an adjustable cam-shaped stop member arranged to locate each shoe in its retracted position with respect to the drum, one of said stop members being actuable for adjustment purposes by the end of the anchored shoe extending beyond said anchor bolt, and the other by an intermediate projecting portion of said anchored shoe end extension extending from a point inwardly of the anchor bolt and in a circumferential direction opposite to the aforesaid shoe end extension, the arrangement being such that, irrespective of the condition of wear of the shoe linings, a constant minimum clearance is maintained between said linings and the brake drum by the normal application of the brake.

2. An improved brake as claimed in claim 1, wherein the extreme end portion of the anchored shoe end extending beyond the anchor bolt, and the aforesaid intermediate projecting portion thereof, constitute lever arms which directly actuate their respective stop members for adjustment purposes.

3. An improved brake as claimed in claim 1, wherein the extreme end portion of the anchored shoe end extending beyond the anchor bolt, and the aforesaid intermediate projecting portion thereof, constitute lever arms, and wherein each of the cam-shaped stop members is pivotally mounted, the movement of each of said arms being adapted directly to effect partial rotation of a pivotally mounted cam-shaped stop member, which partial rotation is arranged to cause a shoe with which said stop member co-acts, to be pressed radially outwardly towards the drum.

4. An improved brake, as claimed in claim 1, wherein the extreme end portion of the anchored shoe end extending beyond the anchor bolt, and the aforesaid intermediate projecting portion thereof, constitute lever arms, and wherein each of the cam-shaped stop members is pivotally mounted on a pin adjacent a striking face on each of said lever arms so that said face engages with a shoulder on the stop member to cause partial rotation thereof in one direction, whereby the shoe with which it co-acts is pressed radially outwardly towards the drum.

5. An improved brake as claimed in claim 1, wherein means are provided for frictionally retaining each of said stop members in an adjusted position.

6. An improved brake as claimed in claim 1, wherein the extreme end portion of the anchored shoe end extending beyond the anchor bolt, and the aforesaid intermediate projecting portion thereof, constitute lever arms, and wherein each of the cam-shaped stop members is pivotally mounted on a pin adjacent a striking face on each of said lever arms so that said face engages with a projection on the stop member to cause partial rotation thereof in one direction, whereby the shoe with which it co-acts is pressed radially outwardly towards the drum, and wherein to ensure that in the retracted position of a shoe, a constant minimum clearance is maintained between a shoe lining and the drum, the several parts are so shaped and arranged that, in the retracted position of a shoe, a clearance space remains between the aforesaid striking face of a lever arm and its co-acting projection on a stop member.

WILFRED DELL KOCH.